United States Patent Office 3,145,701
Patented Aug. 25, 1964

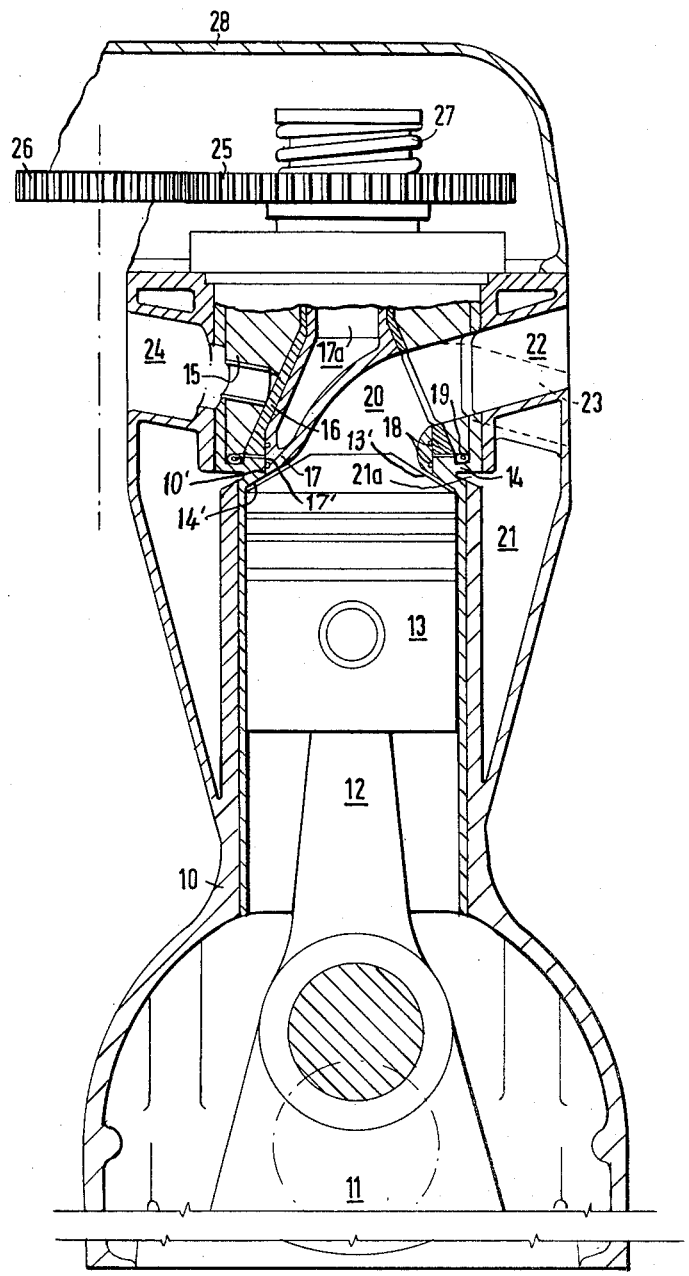

3,145,701
ROTARY VALVES FOR INTERNAL COMBUSTION ENGINES
Frank Metcalf Aspin, Barnacre, Bexton Lane, Bexton, Knutsford, England
Filed Nov. 27, 1961, Ser. No. 155,092
Claims priority, application Great Britain Nov. 30, 1960
7 Claims. (Cl. 123—190)

This invention relates to rotary valves for internal combustion engines of the kind comprising a rotary valve member of conical shape rotatably mounted in a housing of complementary conical shape, located at the combustion end of the cylinder, said valve member being disposed with a part at least of its larger end exposed to gaseous pressure in the working end of the engine.

The invention is particularly applicable to internal combustion engines having rotary valve.

The rotary valve members of such valves are normally spring loaded axially into seating engagement with their housings to obtain an initial sealing engagement of the complementary conical valve surfaces, the rotary valve member being allowed some freedom of axial movement to compensate for relative expansion or contraction of the said rotary valve member and its housing. Such relative axial movement makes it impractical to arrange a mechanical axial thrust bearing between the rotary valve member and its housing which would be self-compensating for such relative expansion or contraction, and this kind of conical rotary valve construction has the further disadvantages that the complementary conical bearing surfaces are therefore subject to all changes of gaseous pressures to which the end area of the rotary valve member including the plan area of any passage therein, is exposed. This area is hereinafter termed the pressure plan area. On the other hand, such conical rotary valve construction has the advantage that the "squeeze" pressure at any instant on any lubricant at the said complementary conical bearing surfaces is, apart from the spring loading, a direct function of the gaseous pressure in the cylinder against which an effective seal must be obtained at the said bearing surfaces.

The present invention is based upon the appreciation that another disadvantage of conical rotary valve constructions, as at present known, is that the pressures on such conical bearing surfaces in particular, are considerably in excess of that which is required to provide an effective gas seal and that such excessive pressure engender unnecessary power losses through friction, with substantial lowering of mechanical efficiency. This problem arises particularly in what are known as "square" or "over square" engines as is the trend in modern engine design in which the diameter of the piston is greater than the stroke compared with engines in which the stroke is greater than the diameter of the piston.

This appreciation is also the basis of my Patent No. 3,051,156 in which mechanical means are embodied in the drive to the rotary valve so as to use the driving torque as a means for mechanically "off-loading" the pressures at the complementary conical bearing surfaces of the valve. Such mechanical "off-loading" has proved to be very effective for normal but not for all engine requirements. For example, it has been found by experiment that the degree of mechanical off-loading is a function of the speed of rotation of the valve member and this factor introduces a further problem of design.

The object of the present invention is to obviate the cause of excess loading so that "off-loading" becomes unnecessary in most instances, the present invention aiming at prevention rather than cure of such condition.

The basic cause of such excess loading is that when a rotary valve has been designed to satisfy other known primary factors, the pressure plan area of the valve is nearly always considerably larger than it should be to avoid such excess loading. Such area is a function of the size of the valve, which in turn is dictated by the design of the valve according to the characteristics required of the engine, e.g. bore to stroke ratio, gas velocity, size of ports, angle of cone and other primary design factors of which these are the most relevant. The angle of cone might be considered as a variable which could be changed to solve the problem, but in practice this is not so. There is actually an optimum angle of cone which, for a variety of reasons which need not be considered here, is found to be the order of 50 degrees included angle, within fairly small limits. Such limitation in turn is largely responsible for design proportions for the valve usually resulting as already stated in too large a pressure plan area. The expression pressure plan area is used to define that area exposed to the pressure within the engine cylinder in a plane normal to the axis of rotation of the rotary valve member.

Research and experiment has now shown that in order to obtain an effective gas seal, the pressure per unit area on the conical sealing surfaces (hereinafter termed the unit area squeeze pressure) resulting from axial load on the valve, must be just greater than the unit area gas pressure i.e. the pressure per unit area on the pressure plan area of the valve.

According to the invention a rotary valve for an internal combustion engine comprises a rotary valve member of conical shape, rotatably mounted in a stationary valve housing having a complementary conical shaped seating, said valve member being disposed with its larger end exposed to gaseous pressure in the working end of the cylinder, characterized in that the valve member is formed with a cylindrical part complementary in the manner of plug-and-socket formations to a cylindrical part of the cylinder end, in combination with gas sealing means at the said complementary cylindrical formations so constructed that the pressure plan area of the rotary valve member exposed to the pressure in the cylinder is smaller than the overall end area of the valve member and so proportioned that the unit area squeeze pressure is just greater than unit area gas pressure both as hereinbefore defined.

The expression "the end of the cylinder" is used herein to include either the re-entrant portion of the valve housing itself or the end of the cylinder or liner therein.

In the accompanying drawings:

FIG. 1 is a diagrammatic longitudinal section of one example of a 4-stroke internal combustion engine having a rotary valve made in accordance with the present invention.

As shown in FIG. 1, the internal combustion engine comprises a combined cylinder block and crankcase 10, crankshaft 11 connecting rod 12 and piston 13. The outer end of the cylinder is formed with an inwardly directed flange 14 above which is a cylindrical space in which is located a stationary valve housing 15, the axis of such space being coaxial with the engine cylinder. Such housing has a conical seating with its larger end adjacent to the inwardly projecting flange, in which seating is located a rotary valve member consisting of an outer shell 16 and an inner core 17 secured, but not bonded together, in such manner that such parts rotate together. The outer part has a conical seating surface complementary to that in the valve housing whilst the inner part has a cylindrical end portion in the periphery of which are located gas sealing rings 18, the upper of which engages a complementary cylindrical portion of the outer part. This cylindrical end portion projects beyond the end of the outer part and into a cylindrical aperture in the inwardly projecting flange 14, the lower sealing ring engaging the inner periphery of such aperture. A thin working clearance space is left above the flange 14, including a recess in which is located a packing ring 19. The thin clearance space is vented, by means not shown, inwardly of said packing ring.

The inner part 17 of the rotary valve member is formed hollow at 17a for cooling purposes and has a curved volume 20 which is ported at one end at the peripheral wall and is open at the other end to the cylinder. This volume forms a passage for incoming and outgoing gases and as described in the earlier Patent No. 2,288,594 forms the major part of the combustion volume when the piston is at that end of its stroke. Part of the under end of the inner part 17 together with the flange 14 constitutes the upper end of the cylinder. The pressure plan area of the rotary valve member, that is to say, the area considered at right angles to the axis of rotation, is the area of the end of the cylindrical end portion of the inner part 17 of the rotary valve, less the developed area of the port at the conical periphery of the outer part projected through the inner end of the volume 20.

The valve has at its lower end a cylindrical outer surface 17' of lesser diameter than and concentric with the bore 10' of the cylinder. Flange 14 has its lower face 14' in alinement with and in proximity to the upper face 13' of piston 13 when the latter is in its uppermost position.

The included angle of the conical bearing surfaces in the housing and on the rotary valve member is 50 degrees and the actual dimensions of such area can be varied at will to satisfy any other factor of design substantially without altering the pressure plan area of the valve, or vice versa the pressure area of the valve may be decided to meet requirements after the other dimensions and factors have been determined.

The drawing shows diagrammatically a cooling space 21 surrounding the cylinder with a re-entrant part 21a into the inwardly projecting flange 14; an inlet port 22; outlet port 23, sparking plug hole 24, driving pinions 25 and 26; constant loading spring 27 for the rotary valve member and cylinder head cover 28.

In operation, the inwardly directed flange 14 acts as a pressure shield to limit the pressure plan area of the rotary valve member irrespective of its overall dimensions; it enables the actual bearing working pressures to be reduced to a minimum sufficient to insure an effective gas seal and, therefore, reduces friction losses and wear; the overall dimensions of the rotary valve member, the size of the volume therein, area of port and other factors can be determined irrespective of valve loading pressures; effective gas sealing conditions may be obtained irrespective of many other factors; the heat-receiving area of the rotary valve member is reduced on its under face due to the shield effect aforesaid; optimum lubrication conditions may be established with low oil pressure requirements, hence lower power loss and lower consumption of lubricating oil and other advantages accrue from the design as will immediately become apparent to the designer of an engine embodying the features of the present invention.

It is to be appreciated that the drawings are in several respects diagrammatic as for example the cylinder liner is shown upwardly extended to receive the valve housing and formed with a re-entrant portion, whereas in practice the outer and inner ends may well be made in two parts and there may be other structural modifications not affecting the principle of the invention.

I claim:
1. A rotary valve for an internal combustion engine, comprising a stationary valve housing, a cylinder below said housing, a piston in said cylinder, a rotary valve of conical shape rotatably mounted in said housing, said housing having a complementary conical shaped seating, said valve being disposed with its larger end exposed to gaseous pressure in the working end of the cylinder, characterized in that the valve is provided at its lower end with a cylindrical outer surface of lesser diameter than and concentric with the bore of said cylinder, the cylinder being provided with a cylinder liner formed with an upward extension receiving the valve housing and an inwardly directed flange separating the piston containing portion of the cylinder liner from said extension, said flange terminating in a cylindrical surface in engagement with the cylindrical outer surface of the valve, the lower faces of said flange and valve being in alignment with each other and in proximity to the upper face of said piston when said piston is in its uppermost position, gas sealing means at said engaging cylindrical surfaces, said rotary valve being so constructed that the pressure plan area of the valve exposed to the pressure in the cylinder is smaller than the overall end area of the valve and is so proportioned that the unit area pressure is slightly greater than the unit area gas pressure on the conical surface of the valve.

2. An internal combustion engine according to claim 1 further characterised in that the extension of the cylinder liner is integral with the piston containing portion thereof.

3. An internal combustion engine according to claim 1 characterized in that said sealing means is an annular member interposed between the lower end of said valve and the inwardly directed flange of the extension of the inner wall of said cylinder.

4. An internal combustion engine according to claim 1 characterized in that an outer shell is interposed between said valve and said housing and in close association with both valve and housing.

5. An internal combustion engine according to claim 4 characterized in that the lower end of said valve extends below the lower end of said outer shell.

6. An internal combustion engine according to claim 1 characterized in that the included angle of the conical bearing surfaces of the rotary valve is of the order of 50°.

7. An internal combustion engine according to claim 1 characterized in that an outer shell is interposed between said valve and said housing and in close association with both valve and housing, and additional sealing means located at the contact area of said valve with said shell.

References Cited in the file of this patent

UNITED STATES PATENTS

| 2,364,529 | Gernandt | Dec. 12, 1944 |
| 2,374,190 | Gernandt | Apr. 24, 1945 |
| 2,377,336 | Frank | June 5, 1945 |
| 2,429,304 | Aspin | Oct. 21, 1947 |
| 2,560,700 | Pervier | July 17, 1951 |
| 2,700,964 | Nallinger | Feb. 1, 1955 |
| 2,736,300 | Flynn | Feb. 28, 1956 |
| 2,769,438 | Witzky | Nov. 6, 1956 |

FOREIGN PATENTS

| 637,362 | Great Britain | May 17, 1950 |
| 2,730,089 | France | Jan. 10, 1956 |